Aug. 27, 1946.  W. M. RIGGLES, JR  2,406,710
LANDING GEAR HOUSING DOOR
Filed Oct. 4, 1943  2 Sheets-Sheet 2
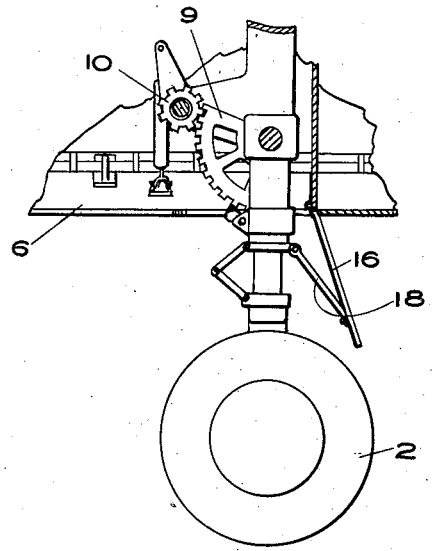
FIGURE 2.
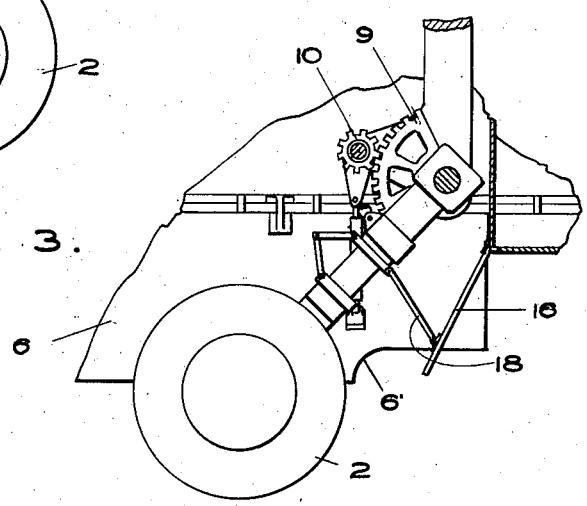
FIGURE 3.
FIGURE 4.
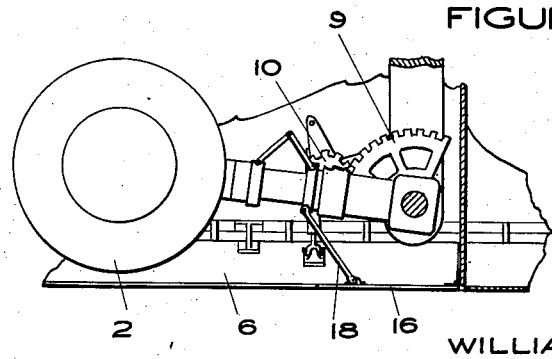
INVENTOR.
WILLIAM M. RIGGLES JR.
BY
George Douglas Jones
ATTORNEY Patented Aug. 27, 1946

2,406,710

UNITED STATES PATENT OFFICE 2,406,710

LANDING GEAR HOUSING DOOR

William M. Riggles, Jr., Middle River, Md.; Blaine B. Ramey, guardian of the estate of said William M. Riggles, Jr., assignor to The Glenn L. Martin Company, Middle River, Md., a corporation of Maryland Application October 4, 1943, Serial No. 504,850

3 Claims. (Cl. 244—102)

This invention relates to an improvement in aircraft landing gear and the related housing structure.

The conventional retractable landing gear is moved in a compartment within the fuselage or the engine nacelle. A pair of doors, or a door, forms a closure for the compartment when the gear is retracted but when extended, the doors remain open until the landing gear is retracted.

An object of this invention is the improvement of the aerodynamics of the airplane by removing some of the drag at take-off and landing due to the landing gear housing doors remaining in the open position.

Another object of this invention is the protection of the retracting mechanism from dirt and dust during take-off and taxiing.

Another object of this invention is the protection of the retracting mechanism and other parts housed in the landing gear stowage compartment from unauthorized tampering when the aircraft is on the ground in the hangar or on the airport.

Further and other objects will become apparent from the description of the accompanying drawings which form a part of this disclosure and in which like numerals refer to like parts.

In the drawings:

Figures 2, 3 and 4 are schematic views showing the operation of the device.

Figure 1:
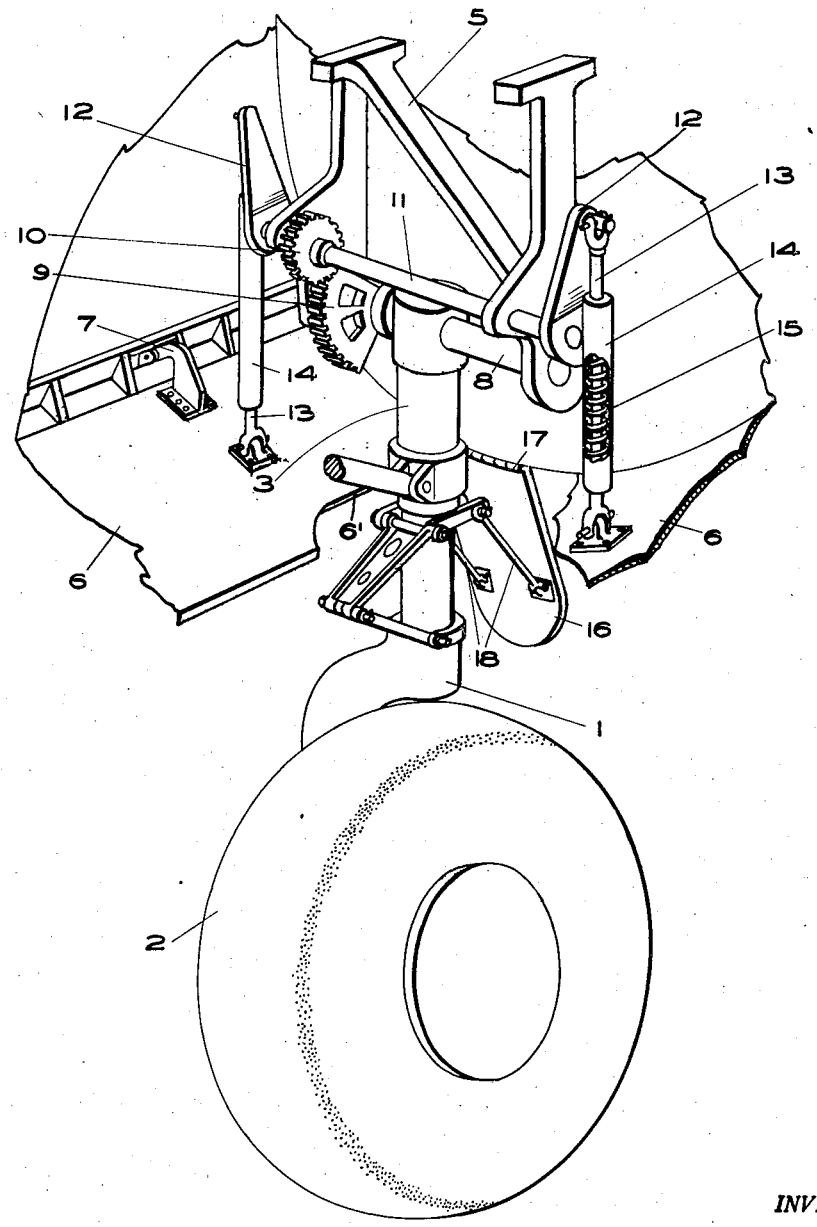
Figure 1 is a fragmentary perspective view of the invention.

The landing gear generally indicated as 1, comprises a wheel 2 and an oleo supporting strut 3. This strut may be supported from the aircraft structure in any convenient manner, such as by a bracket 5.

The compartment into which the landing gear is retracted when the plane is in flight has a pair of doors 6, hinged to the aircraft structure at 7.

The doors are cut out as shown at 6' so that the doors can close around oleo strut 3 in the extended position.

Mounted on the pivoting structure 8 is a gear segment 9, the arc of which is greater than the arc through which the gear travels from the retracted to the extended positions. Gear 10 meshes with segment 9 and is of such a diameter that the gear makes one complete revolution between the fully retracted and fully extended positions of the landing gear. Gear 10 is mounted on and turns shaft 11. Crank arms 12 are secured to shaft 11 and move linkages to actuate the doors. These linkages consist of rods 13 in sleeves 14. A compression spring 15 surrounds the rod within the sleeve so that the spring loading causes the doors to fit tightly against their supports when closed.

Auxiliary door 16 is hinged at 17 to the aircraft structure and is so formed that it closes the opening formed by the cut-out portions 6' when wheel 2 is retracted within the compartment. Linkage 18, which may also be spring loaded, closes door 16 with the retraction of the strut.

The door moving mechanism is operated upon the actuation of the landing gear. As the landing gear moves from the extended position, as shown in Figures 2 to 4, gear segment 9 rotates gear 10 which causes the linkages on the doors to move downwardly, opening the doors to the wide open position in one-half revolution of the gear or about 45 degrees motion of the landing gear. As the landing gear is retracted through the doors, into the compartment, the doors are closed by the linkages and door 16 follows strut 3 to close the opening formed by the cut-out portions between the doors.

It is to be understood that certain changes, alterations, modifications and substitutions can be made without departing from the spirit and scope of the appended claims.

I claim as my invention:

1. In aircraft having retractable landing gear, means forming a compartment within the aircraft structure to house said landing gear in the retracted position, doors forming a closure for said compartment to permit the extension of said gear for landing, said doors having cut-out portions in their adjoining edges to fit around said landing gear in the extended position whereby the opening to said compartment is substantially closed, a mechanism secured to said doors actuated by the retraction of said landing gear to open said doors to permit the passage of said landing gear into said compartment and close said doors when said landing gear is fully retracted, closure means actuated by means secured to said landing gear strut whereby the opening formed by the cut-out portions in the edges of said doors is closed upon the full retraction of said landing gear.

2. In aircraft having retractable landing gear, means forming a compartment within the aircraft structure to house said landing gear in the retracted position, doors forming a closure for said compartment to permit the extension of said gear for landing, said doors being formed to fit around said landing gear in the extended position to substantially close said compartment, and a mechanism actuated by means secured to said landing gear strut to open said doors to permit the retraction of said gear within said compartment and to close said doors when said gear is fully retracted, said mechanism including spring-coupled linkages for moving said doors whereby said doors are held firmly in the closed position.

3. In aircraft having retractable landing gear, means forming a compartment within the aircraft structure to house said landing gear in the retracted position, doors forming a closure for said compartment to permit the extension of said gear for landing, said doors being formed to fit around said landing gear in the extended position to substantially close said compartment, and a mechanism actuated by the extension of said landing gear to open said doors to permit the extension of said landing gear, and close the doors when the landing gear is fully extended, said mechanism comprising a gear segment moved through an arc corresponding to the arc of the landing gear from the extended to the retracted position, a shaft having a gear secured thereto which is moved by the gear segment one revolution for the motion of the landing gear between extended and retracted positions, crank arms secured to said shaft to actuate linkage mechanisms to move said doors from closed, to open, to closed positions during the extension or retraction of said landing gear.

WILLIAM M. RIGGLES, Jr.